United States Patent [19]

Tamamura et al.

[11] 4,302,633
[45] Nov. 24, 1981

[54] ELECTRODE PLATE ELECTRET OF ELECTRO-ACOUSTIC TRANSDUCER AND ITS MANUFACTURING METHOD

[75] Inventors: Junichi Tamamura, Yao; Yoshiyuki Murakami, Habikino; Akira Terada, Ikeda, all of Japan

[73] Assignee: Hosiden Electronics Co., Ltd., Osaka, Japan

[21] Appl. No.: 134,806

[22] Filed: Mar. 28, 1980

[51] Int. Cl.³ .................... H04R 19/00; H04R 31/00
[52] U.S. Cl. .................... 179/111 E; 29/594; 307/400
[58] Field of Search .................... 179/111 E; 307/400; 29/594

[56] References Cited
U.S. PATENT DOCUMENTS 3,449,093  6/1969  Baxt et al. .................... 307/400
3,449,094  6/1969  Baxt et al. .................... 307/400
3,755,043  8/1973  Igarashi et al. .................... 179/111 E
3,967,027  6/1976  Igarashi et al. .................... 179/111 E
4,014,091  3/1977  Kodera et al. .................... 179/111 E Primary Examiner—George G. Stellar
Attorney, Agent, or Firm—Pollock, Vande Sande & Priddy

[57] ABSTRACT

A high molecular film for polarization is disposed on an electrode plate with an intermediate high molecular film sandwiched therebetween to form a laminated member, the intermediate high molecular film having a lower melting point than the high molecular film for polarization. The laminated member is heated at a temperature in the vicinity of the melting point of the intermediate high molecular film to fusion-weld the high molecular film for polarization to the electrode plate through the intermediate high molecular film, and then the high molecular film for polarization is polarized.

10 Claims, 6 Drawing Figures

ELECTRODE PLATE ELECTRET OF ELECTRO-ACOUSTIC TRANSDUCER AND ITS MANUFACTURING METHOD

BACKGROUND OF THE INVENTION

This invention relates to an electret, namely an elecrode plate having a polarized high molecular film, which is used in an electro-acoustic transducer which converts an electrical signal into an acoustic signal or vice versa through utilization of a change in electrostatic capacitance.

There has been put to practical use an electrostatic speaker in which an electrode plate electret having an electret deposited on one side of an electrode plate and a diaphragm are disposed in opposing relation to each other and an electrical signal is applied across them to vibrate the diaphragm in accordance with the electrical signal, thus converting the electrical signal to an acoustic signal. Also, there has been carried into practice an electrostatic microphone in which an electrode plate electret and a diaphragm are disposed opposite each other, the diaphragm is vibrated by an acoustic signal and the acoustic signal is converted to an electrical signal through utilization of a change in the electrostatic capacitance between the electrode plate electret and the diaphragm.

The following methods have heretofore been employed for the manufacture of the electrode plate electret used in such electrostatic type electro-acoustic transducers. A polarized high molecular film, commonly referred to as an electret film, is stuck to an electrode plate with an adhesive binder. With this method, however, the adhesive binder exerts bad influence on the electret film to degrade the characteristic of the electret and reduce the conversion gain of the transducer. Also, it is difficult to stick the electret film uniformly over the entire area of the electrode plate; hence, the electret film is liable to be mechanically distorted, which hinders its electrification and reduces its service life. Furthermore, this method is also disadvantageous in that the operation for sticking the electret film to the electrode plate is cumbersome and hence is poor in mass productivity and introduces dispersion in quality.

Another method that has been employed in the art is to weld the high molecular film to the electrode plate by fusion at a temperature close to the melting point of the film and then render the electret film on the electrode plate into an electret. With this method, however, the thickness of the high molecular film is made uneven by heating in the fusion welding of the film to the electrode plate, resulting in the electret film becoming unstable physically and hence short-lived. Moreover, this method involves heat treatment under high temperatures for heating the assembly up to the vicinity of the melting point of the high molecular film, and consequently this method is also poor in productivity.

It is an object of the present invention to provide an electrode plate electret which is easy to manufacture, suitable for mass production, stable physically and long-lived.

Another object of the present invention is to provide a method for the manufacture of an electrode plate electret with an electret film which does not require the use of an adhesive binder and achieves a uniform thickness of the electret film.

Another object of the present invention is to provide an electrode plate electret manufacturing method which enables mass production of electrode plate electrets that have an electret film of a uniform thickness, long service life and uniform characteristics.

Yet another object of the present invention is to provide an electrode plate electret manufacturing method which does not involve any treatment under high temperatures and hence is excellent in productivity.

SUMMARY OF THE INVENTION

In the electrode plate electret of the present invention, an intermediate high molecular film is interposed between a polarized high molecular film and an electrode plate. The intermediate high molecular film has a lower melting point and a smaller thickness than the polarized high molecular film. The electrode plate electret has formed therethrough a suitable number of holes 80 corresponding to holes 34 and 56 in FIGS. 1 and 2. This electrode plate electret is produced in the following manner: The high molecular film for polarization is fusion-welded to a thin film member, i.e. the electrode plate with the intermediate high molecular film sandwiched therebetween. The high molecular film for polarization, thus fusion-welded to the electrode plate, is polarized. The intermediate high molecular film is lower in melting point than the high molecular film for polarization, and the temperature for fusion welding is selected in the vicinity of the melting point of the intermediate film. Accordingly, the fusion welding takes place at a relatively low temperature and hence is easy to conduct. The thickness of the high molecular film for polarization is not changed by the fusion welding and is held uniform. As a result of this, the electrode plate electret of the present invention is stable physically, excellent electrically and long-lived. It is preferred that the intermediate high molecular film is smaller in thickness than the high molecular film for polarization. In the fusion welding, heating and pressurizing are carried out at the same time. The high molecular film for polarization may also be fusion-welded to the electrode plate through the intermediate high molecular film after being polarized. Also in this case, since the temperature for fusion welding is selected lower than the melting point of the polarized high molecular film, there is no fear of the thickness of the polarized film being changed, and deterioration of the polarization is also negligible. Since the temperature and time for fusion welding of the polarized high molecular film to the electrode plate through the intermediate high molecular film is substantially equal to the temperature and time for aging the polarized film, the overall manufacturing time can be reduced by performing the aging concurrently with the fusion welding.

DESCRIPTION OF THE PREFERRED EMBODIMENTS

Figure 1:
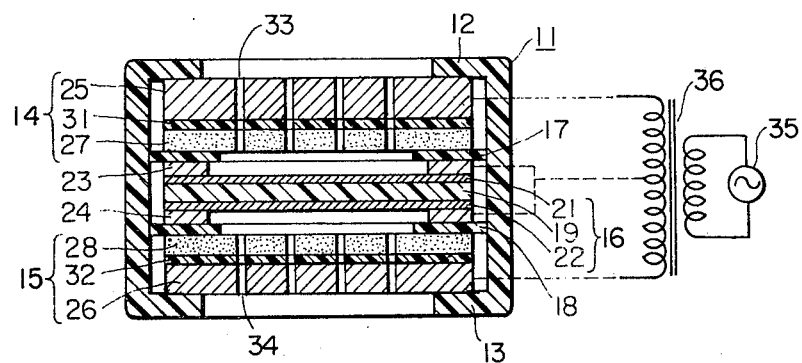
FIG. 1 is a cross-sectional view showing an example of an electro-acoustic transducer for use in an electrostatic type headphone.

To facilitate a better understanding of the present invention, a description will be given first of an example of an electro-acoustic transducer employing an electrode plate electret. FIG. 1 shows an example of an electro-acoustic transducer for use in a headphone. A cylindrical case 11 has inward flanges 12 and 13 formed integrally therewith at its both open ends. Electrode plate electrets 14 and 15 are respectively disposed on the inside of the flanges 12 and 13 to close the both openings of the case 11. In the space defined by the electrode plate electrets 14 and 15 is disposed a diaphragm 16 with ring-shaped spacers 17 and 18 of an insulating material respectively sandwiched between it and the electrode plate electrets. The diaphragm 16 is formed by depositing conductive layers 21 and 22 on both sides of a polyester resin or like high molecular film 19, for example, 3 to 6μ thick, by means of evaporation of aluminum or like metal. Metal rings 23 and 24 are interposed respectively between the conductive layers 21 and 22 and the spacers 17 and 18. The electrode plate electrets 14 and 15 are respectively composed of conductors, i.e. electrode plates 25 and 26 and electret films 27 and 28 respectively attached thereto. These electrode plate electrets are disposed with the electrode plates 25 and 26 held in contact with the flanges 12 and 13 of the case 11 respectively.

The electrode plate electrets 14 and 15 of the present invention have high molecular films 31 and 32 respectively interposed between the electret films 27 and 28 and the electrode plates 25 and 26. The electrode plate electrets 14 and 15 have formed therethrough sound emission holes 33 and 34 respectively. An electric signal of a signal source 35 is provided to the primary side of a transformer 36, the secondary side of which has its both ends electrically connected to the electrode plates 25 and 26, respectively, and has its mid point electrically connected to the metal rings 21 and 22. With such an arrangement, the diaphragm 16 is driven in a push-pull manner in response to the electrical signal available from the signal source 35. Either one of the conductive layers 21 and 22 of the diaphragm 16 may also be omitted.

Figure 2:
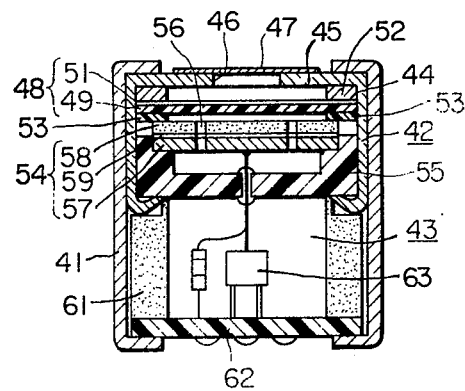
FIG. 2 is a cross-sectional view showing an example of an electrostatic type microphone.

FIG. 2 illustrates an example of an electrostatic microphone, in which a microphone unit 42 and an impedance conversion unit 43 are arranged in a cylindrical case 41 in its axial direction. In the microphone unit 42, a cylindrical capsule 44 is housed in the case 41 in contact with its interior surface, and a front plate 45 of the capsule 44 has formed therethrough a sound guide hole 46, which is covered with a dust-proof cloth 47. On the inside of the front plate 45 is disposed a diaphragm 48 in adjacent but spaced relation thereto. The diaphragm 48 is formed by vapor-depositing a metal on one side of a high molecular film 49 to form thereon a conductive layer 51. The diaphragm 48 is pasted to a metal ring 52 on the side of the conductive layer 51, and the metal ring 52 is disposed in contact with the inner surface of the front plate 45 of the capsule 44. Adjacent the diaphragm 48 is placed an electrode plate electret 54 with a ring-shaped spacer 53 interposed therebetween. The electrode plate electret 54 is held by an electrode holder 55. The electrode holder 55 is a bottomed, cylindrical member of a synthetic resin and supports at its open end the electrode plate electret 54 to define a rear compartment. The electrode plate electret 54 has formed therethrough an air hole 56.

The electrode plate electret 54 comprises an electrode plate 57 and an electret film 58 attached thereto, and in the present invention, an intermediate high molecular film 59 is sandwiched between the electrode plate 57 and the electret film 58. In the impedance conversion unit 43, a tubular member 61 is placed behind the capsule 44 and substantially in contact with the inner peripheral surface of the case 41, and a printed-circuit board 62 is placed at the back of the tubular member 61 in a manner to close its rear open end. The both end portions of the case 41 are respectively bent to the front side of the front plate 45 of the capsule 44 and the back side of the printed-circuit board 62, by which the microphone unit 42 and the impedance conversion unit 43 are mechanically coupled together. The printed circuit board 62 has formed thereon an impedance converter 63 in the tubular member 61. The impedance converter 63 is connected to the electrode plate 57 of the electrode plate electret 54 via the bottom plate of the electrode holder 55. By an acoustic signal entering into the microphone from the front thereof via the second guide hole 46, the diaphragm 48 is vibrated to change the electrostatic capacitance between the diaphragm 48 and the electrode plate electret 54 and the resulting electrical signal is outputted in the form of a low impedance signal from the impedance converter 63.

Figure 3:
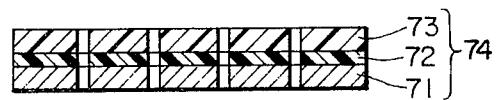
FIG. 3 is a cross-sectional view illustrating an example of an electrode plate electret of the present invention.

The present invention is directed to the electrode plate electrets 14, 15 and 54 for use in such electro-acoustic transducers as shown in FIGS. 1 and 2. As indicated generally by 74 in FIG. 3, the electrode plate electret of the present invention has a high molecular film 73 for polarization use which is deposited on a conductor, i.e. an electrode plate 71 with an intermediate high molecular film 72 sandwiched therebetween.

As the high molecular film 73 for polarization, use is made of a 4 ethylene fluoride-6 propylene fluoride copolymer film (FEP), a polycarbonate film (PC), a polyethylene film (PE), a polyvinylidene fluoride film (PVF$_2$) and a polypropylene film (PP). These high molecular films have fusion-welding temperature ranges from 282° to 371° C., 204° to 221° C., 121° to 204° C., 204° to 218° C. and 140° to 204° C., respectively. For example, in the case of using the electrode plate electret in a headphone, the high molecular film 73 for polarization is formed to have a diameter of 50 to 60 mm and a thickness of 75 to 125μ and, in this case, it is possible to employ a known method for increasing the adhesiveness of the film, as required, by treating one side of the film with a naphthalene solution of sodium to make it relatively rough, or depositing aluminum, nickel or like metal on one side of the film by evaporation.

The intermediate high molecular film 72 is similarly formed 50 to 60 mm in diameter and 10 to 30μ thick and is then interposed between the electrode plate 71 and the high molecular film 73 for polarization. In this case, the electrode plate 71, the intermediate high molecular film 72 and the high molecular film 73 for polarization are placed one on another in this order to form a laminated member 74, with the pretreated side of the film 73 held on the film 72.

Then, the laminated member 74 is heated at an atmospheric temperature lying within the fusion-welding temperature range of the intermediate high molecular film 72, by which the polarizing high molecular film 73 for polarization is adhered to the electrode plate 71 through the intermediate high molecular film 72.

Figure 4:
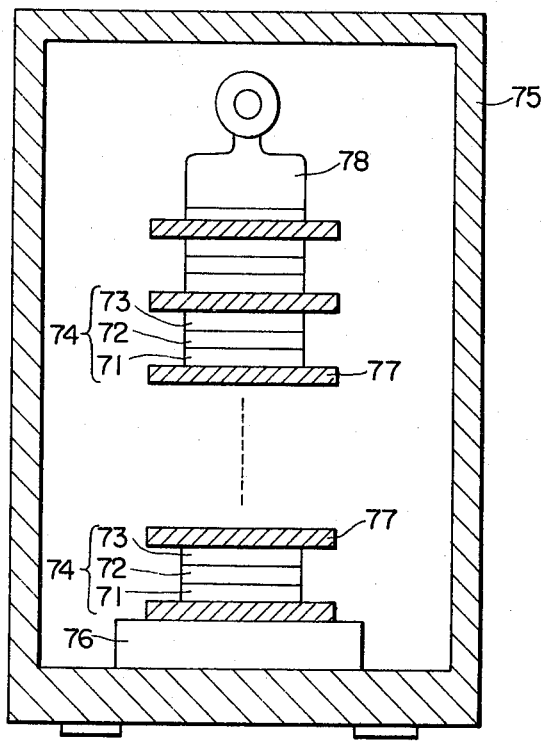
FIG. 4 is a cross-sectional view showing a heating equipment in which a plurality of laminated electret assemblies placed one on another are simultaneously subjected to a fusion-welding process.

For the above heat-fusing treatment, use is made of such a thermostat as shown in FIG. 4, in which a separator 77 as of a 4 polyethylene fluoride film (PTFE film) is placed on a base 76 and the electrode plate 71, the intermediate high molecular film 72 and the high molecular film 73 for polarization are placed in this order on the separator 77 to form thereon the laminated member 74. The separator 77 has a heat resistance above 300° C. and is not fusion-welded to the laminated member 74.

In FIG. 4, a plurality of such laminated members 74 are heat-treated simultaneously; namely, a desired number of laminated members 74 are placed one on another with the separator 77 inserted between adjacent ones of them. Further, for example, an about 2-Kg weight 78 is mounted on the uppermost separator 77.

The temperature in the thermostat 75 is set to a value lying within the fusion-welding temperature range of the intermediate high molecular film 72 used. In the case of using, for example, a polycarbonate film as the intermediate high molecular film 72, the heating temperature in the thermostat 75 is in the range of 210° to 250° C.; in the case of a polyethylene film, the heating temperature is about 150° C.; in the case of a polyvinylidene fluoride film, the heating temperature is about 220° C.; and in the case of a polypropylene film, the heating temperature is approximately 200° C. The thermostat 75 is maintained at the set temperature for an hour or so and then allowed to stand for cooling.

Figure 5:
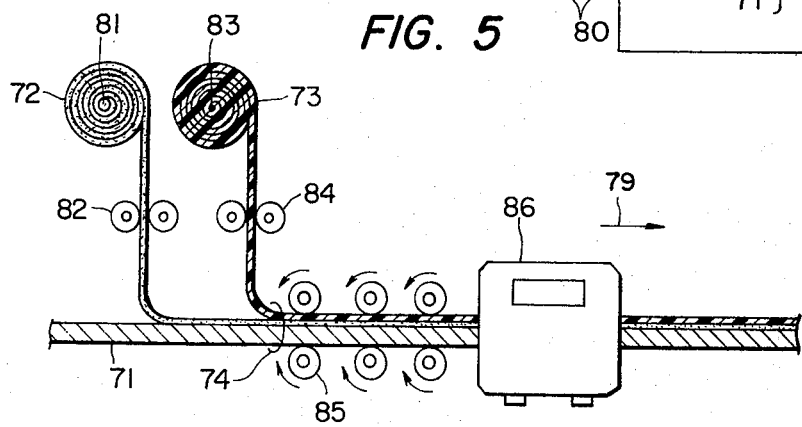
FIG. 5 is a diagram illustrating an equipment for continuously forming a laminated electret assembly and continuously subjecting it to the fusion-welding process.

Another method of this heat-fusion treatment is such, for example, as shown in FIG. 5. An aluminum or like metal electrode plate 71 about 0.6 to 1 mm thick is fed in the direction of the arrow 79, and the intermediate high molecular film 72 wound on a supply bobbin 81 is payed out onto the electrode plate 71 through guide rollers 82. Further, the high molecular film 73 for polarization wound on a supply bobbin 83 is similarly payed out onto the intermediate high molecular film 72 through guide rollers 84. The high molecular film 73 for polarization is 75 to 125μ thick and the side of the film for contact with the intermediate high molecular film 72 can be made relatively rough by treatment with a naphthalene solution of sodium, or deposited with aluminum, nickel or like metal by evaporation, as described previously. The intermediate high molecular film 72 is approximately 20 to 30μ thick. The laminated member 74 composed of the electrode plate 71, the intermediate high molecular film 72 and the high molecular film 73 for polarization is fed into a heating furnace 86 via heat rollers 85 at a predetermined feeding speed. The temperature in the heating furnace 86 is set at a predetermined value within the fusion-welding temperature range of the intermediate high molecular film 72. Though not shown, heat rollers are also provided in the heating furnace 86 for imparting a predetermined pressure to the laminated member 74; namely, the laminated member 74 passes through the heating furnace 86 while being heated and pressurized for a predetermined period of time. In this way, the high molecular film 73 for polarization is sticked to the electrode plate 71 through the intermediate high molecular film 72.

The laminated member 74 composed of the high molecular film 73 for polarization, the intermediate high molecular film 72 and the electrode plate 71, thus assembled together by the heat-fusing process undergoes the polarization process for polarizing the high molecular film 73. Prior to the polarization process, holes 80 (see FIG. 6) corresponding to the holes 34 and 56 in FIGS. 1 and 2 are made in the laminated member 74 by means of, for instance, a press. In the case of continuously forming the laminated member 74 as shown in FIG. 5, the laminated member 74 can also be punched out, at the same time, into the shape of an electrode plate electret which is ultimately used in an electroacoustic transducer.

Figure 6:
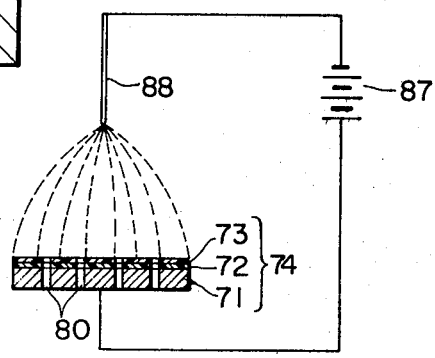
FIG. 6 is a diagram explanatory of a polarization method employed in the present invention.

FIG. 6 illustrates an example of the polarization process, in which the laminated member 74 after being subjected to the heat-fusing process is placed on a base (not shown). The plus side of a power source 87 is connected to the electrode plate 71 which is the lowermost layer of the laminated member 74, and a needle electrode 88, which is connected to the minus side of the power source 87, is disposed above the uppermost high molecular film 73 of the laminated member 74 perpendicularly thereto at a distance of about 50 mm away from substantially the center of the film 73. A DC voltage of about 25 KV is applied across the electrode plate 71 and the needle electrode 88 for about 20 to 30 minutes to produce a corona discharge on the surface of the high molecular film 73. After the polarization process, the laminated member 74 is subjected to aging at a temperature of approximately 150° C. for an hour or so thus, completing all the manufacturing processes. Example As the high molecular film 73 for polarization use was made of a 4 ethylene fluoride-6 propylene fluoride copolymer film having a melting point of 260° to 280° C. and a thickness of 125, and one side of the film was made slightly roughened using a sodium solution. The high molecular film 73 was fusion-welded to a 1-mm thick aluminum electrode plate 71 at a temperature of 240° C., using, as the intermediate high molecular film 72, a 20-μ thick polycarbonate film having a melting point of 220° to 230° C. After the thus fusion-welded high molecular film 73 was polarized at −25 KV by the needle electrode corona discharge method described previously in connection with FIG. 6, the film was aged at 150° C. for an hour. As a result of this, the initial voltage of the surface potential was about −850 V. This sample was subjected to a temperature-acceleration test at 90° C., and the time measured until the magnitude of the surface potential was attenuated by 1 dB, that is, down to 89.1% of its an initial value was 1920 hours.

On the other hand, the same high molecular film for polarization use as above mentioned was fusion-welded to the abovesaid electrode plate at 280° C. without using the intermediate high molecular film and was polarized under the same conditions as referred to above, and then aged. The surface potential of this sample was about −850 V as in the case where the intermediate high molecular film was used; however, the time until the magnitude of the surface potential was attenuated by 1 dB in the temperature-acceleration test was 150 hours, which was markedly short as compared with the case where the intermediate high molecular film was used.

As described above, since the electrode plate electret of the present invention employs the intermediate high molecular film and is fusion-welded to the electrode plate at the fusion-welding temperature of the intermediate film, the fusion-welding temperature is relatively low to make the fusion welding easier by that. On top of that, since the melting point of the high molecular film for polarization is higher than the fusion-welding temperature, the high molecular film for polarization fusion-welded to the electrode plate is uniformly thick and stable physically and long-lived. As compared with the case of using an adhesive binder, the fusion welding provides for enhanced workability of the high molecular film for polarization and ensures uniform fusion welding of the film to the electrode plate over the entire area thereof. Moreover, the electrode electret of this invention is suitable for mass production.

In the foregoing, the high molecular film for polarization is fusion-welded to the electrode plate and then rendered into an electret, but it is also possible to polarize the high molecular film in advance and then fusion-weld the polarized film to the electrode plate using the intermediate high molecular film. In this case, since the fusion welding takes place at a temperature lower than the melting point of the high molecular film for polarization, the polarization of the high molecular film is hardly deteriorated. Further, the conditions for fusion welding, such as temperature and time, are substantially the same as the aging conditions for rendering the polarized film into an electret, so that aging for polarization can be conducted concurrently with heating for fusion welding, making it possible to reduce the overall manufacturing time.

The polarization of the high molecular film can be achieved not only by the corona discharge polarization method but also by a heat polarization method, an electron beam polarization method and so forth. But the corona discharge method enables the polarization in air at room temperature and is simple in equipment. Further, according to the corona discharge polarization method, a number of laminated members can be subjected to the polarization treatment in succession by feeding the laminated member 74 having the holes 80 shown in FIG. 6 to a corona discharge polarization room by means of a belt conveyor. In this case, a conductive belt conveyor is employed and electrically grounded, and the electrode plate 71 is contacted with the belt conveyor.

It is preferred that the side of the electrode plate to which the intermediate high molecular film is fusion-welded is roughened by, for example, No. 80 to 600 sand-blast, that is, by sandblasting. In such a case, the ruggedness of the rough surface produces a rivetting effect for the intermediate high molecular film, making it difficult for the film to peel off. In the case where the high molecular film for polarization is fusion-welded to the electrode plate first and then plarized, the ruggedness of the rough surface of the electrode plate increases its effective area for polarization. This causes scattering of potential lines and increases the number of potential lines of the polarized high molecular film per unit area and suppresses scattering of the potential lines per unit area, resulting in many potential lines. In other words, the applied voltage per unit area increases equivalently and polarization is performed sufficiently and uniformly and is stable.

It will be apparent that many modifications and variations may be effected without departing from the scope of the novel concepts of this invention.

What is claimed is:

1. A method for the manufacture of an electrode plate electret for an electrostatic type electro-acoustic transducer, comprising the steps of:

forming a laminated member by inserting between a high molecular film for polarization and an electrode plate an intermediate high molecular film having a lower melting point than the high molecular film for polarization;

heating the laminated member at a temperature near the melting point of the intermediate high molecular film to fusion-weld the high molecular film for polarization to the electrode plate through the intermediate high molecular film; and polarizing the high molecular film for polarization of the fusion-welded laminated member.

2. An electrode plate electret manufacturing method according to claim 1, wherein the fusion welding step is composed of placing a plurality of said laminated members one on another with a separator interposed between adjacent ones of them, the separator being higher in melting point than the intermediate high molecular film and easy to peel off from the electrode plate and the high molecular film for polarization, disposing the laminated members in a thermostat while pressuring them from above, and maintaining the thermostat at the temperature for the fusion welding.

3. An electrode plate electret manufacturing method according to claim 1, wherein the laminated member forming step is achieved by continuously feeding the electrode plate; continuously feeding the intermediate high molecular film onto the electrode plate from a supply bobbin having wound thereon the intermediate high molecular film, at the same feeding speed as the electrode plate; and continuously feeding the high molecular film for polarization from a supply bobbin having wound thereon the high molecular film for polarization, at the same feeding speed as the electrode plate.

4. An electrode plate electret manufacturing method according to claim 3, wherein the fusion-welding step is a step in which the laminated member, continuously feeding the electrode plate, the intermediate high molecular film and the high molecular film for polarization, is passed through a heating furnace for a predetermined period of time.

5. An electrode plate electret manufacturing method according to any one of the preceding claims, wherein the surface of the high molecular film for contact with the intermediate high molecular film is made slightly rough.

6. An electrode plate electret manufacturing method according to any one of claims 1 to 4, wherein the intermediate high molecular film is 10 to 30$\mu$ in thickness.

7. A method for the manufacture of an electrode plate electret for an electrostatic type electro-acoustic transducer, comprising the steps of:

forming a laminated member composed of a polarized high molecular film and an electrode plate with an intermediate high molecular film sandwiched therebetween, the intermediate high molecular film having a lower melting point than the polarized high molecular film; and heating the laminated member at a temperature near the melting point of the intermediate high molecular film to fusion-weld the polarized high molecular film to the electrode plate through the intermediate high molecular film.

8. An electrode plate electret manufacturing method according to claim 7, wherein the fusion welding step is to age the polarization of the polarized high molecular film.

9. An electrode plate electret for an electrostatic type electro-acoustic transducer, comprising:
   an electrode plate;
   a polarized high molecular film; and
   an intermediate high molecular film sandwiched between the electrode plate and the polarized high molecular film and fusion-welded to both of them, the intermediate high molecular film having a lower melting point than the polarized high molecular film.

10. An electrode plate electret according to claim 9, wherein the surface of the electrode plate for contact with the intermediate high molecular film is made rough.